United States Patent
Lei

(10) Patent No.: US 10,575,181 B2
(45) Date of Patent: Feb. 25, 2020

(54) CELLULAR SERVICE BORROWING USING DEDICATED SHORT RANGE COMMUNICATION TECHNOLOGY

(71) Applicant: Ford Global Technologies, LLC, Dearborn, MI (US)

(72) Inventor: Oliver Lei, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/749,702

(22) PCT Filed: Aug. 5, 2015

(86) PCT No.: PCT/US2015/043797
§ 371 (c)(1),
(2) Date: Feb. 1, 2018

(87) PCT Pub. No.: WO2017/023314
PCT Pub. Date: Feb. 9, 2017

(65) Prior Publication Data
US 2018/0227765 A1    Aug. 9, 2018

(51) Int. Cl.
*H04B 7/14*      (2006.01)
*H04W 16/06*    (2009.01)
(Continued)

(52) U.S. Cl.
CPC .............. *H04W 16/06* (2013.01); *H04B 1/44* (2013.01); *H04W 48/04* (2013.01); *H04W 4/46* (2018.02); *H04W 28/26* (2013.01); *H04W 88/06* (2013.01)

(58) Field of Classification Search
USPC ....... 370/229, 230, 236, 246, 315, 328, 351, 370/355, 356, 357, 395.2
See application file for complete search history.

(56) References Cited

U.S. PATENT DOCUMENTS

| 7,457,608 B2 | 11/2008 | Shah |
| 7,693,511 B2 | 4/2010 | Bottrich et al. |

(Continued)

FOREIGN PATENT DOCUMENTS

KR    101375285 B1    3/2014

OTHER PUBLICATIONS

International Preliminary Report on Patentability for PCT Application No. PCT/US2015/043797 dated Dec. 4, 2017.

(Continued)

*Primary Examiner* — Kwang B Yao
*Assistant Examiner* — Nguyen H Ngo
(74) *Attorney, Agent, or Firm* — Brandon Hicks; Eversheds Sutherland (US) LLP

(57) ABSTRACT

Various embodiments of the present disclosure provide systems and methods for cellular service borrowing between vehicles. More particularly, the system uses Dedicated Short Range Communication (DSRC) technology in Telematics. According to the present disclosure when the vehicle passenger of first vehicle wants to place a cellular service, such as a phone call, but does not possess a phone or infrastructure in the first vehicle to complete the cellular service. The system and method disclosed herein enable the passenger to send a message to surrounding vehicles via DSRC technology. This message requests a cellular call "borrowing" from other vehicles. If one of the surrounding vehicles accepts the request, the surrounding vehicle completes the cellular service (i.e., places the phone call) and relays cellular service audio back to first passenger's vehicle via DSRC. The phone call can be placed via cell phone or telematics control unit present in the surrounding vehicle.

17 Claims, 4 Drawing Sheets

(51) Int. Cl.
    *H04B 1/44*       (2006.01)
    *H04W 48/04*    (2009.01)
    *H04W 4/46*       (2018.01)
    *H04W 28/26*     (2009.01)
    *H04W 88/06*     (2009.01)

(56) References Cited

U.S. PATENT DOCUMENTS

| | | | | |
|---|---|---|---|---|
| 8,843,104 | B2* | 9/2014 | Adibi | H04W 40/22 |
| | | | | 455/404.1 |
| 8,902,818 | B2* | 12/2014 | Chu | H04W 76/10 |
| | | | | 370/328 |
| 9,369,856 | B2* | 6/2016 | Morgan | H04W 4/023 |
| 2003/0224840 | A1* | 12/2003 | Frank | G01C 21/26 |
| | | | | 455/575.9 |
| 2004/0192193 | A1 | 9/2004 | Silvester | |
| 2004/0203696 | A1* | 10/2004 | Jijina | G01C 21/26 |
| | | | | 455/420 |
| 2007/0171854 | A1 | 7/2007 | Chen et al. | |
| 2008/0102817 | A1 | 5/2008 | Shenassa et al. | |
| 2010/0279647 | A1* | 11/2010 | Jacobs | H04B 7/15507 |
| | | | | 455/404.1 |
| 2011/0003578 | A1* | 1/2011 | Chen | G08G 1/205 |
| | | | | 455/404.1 |
| 2011/0098016 | A1* | 4/2011 | Hatton | G08B 25/016 |
| | | | | 455/404.2 |
| 2011/0121991 | A1 | 5/2011 | Basir | |
| 2012/0039248 | A1 | 2/2012 | Schneider et al. | |
| 2012/0197486 | A1 | 8/2012 | Elliott | |
| 2014/0049385 | A1* | 2/2014 | Mueller | B60Q 9/00 |
| | | | | 340/436 |
| 2014/0067392 | A1 | 3/2014 | Burke et al. | |
| 2015/0029866 | A1* | 1/2015 | Liao | H04W 4/023 |
| | | | | 370/241 |
| 2015/0310740 | A1* | 10/2015 | Elzein | G08G 1/0965 |
| | | | | 340/902 |
| 2016/0286590 | A1* | 9/2016 | Cheng | H04W 4/90 |

OTHER PUBLICATIONS

International Search Report and the Written Opinion for PCT Application No. PCT/US2015/043797 dated Oct. 23, 2015.

\* cited by examiner

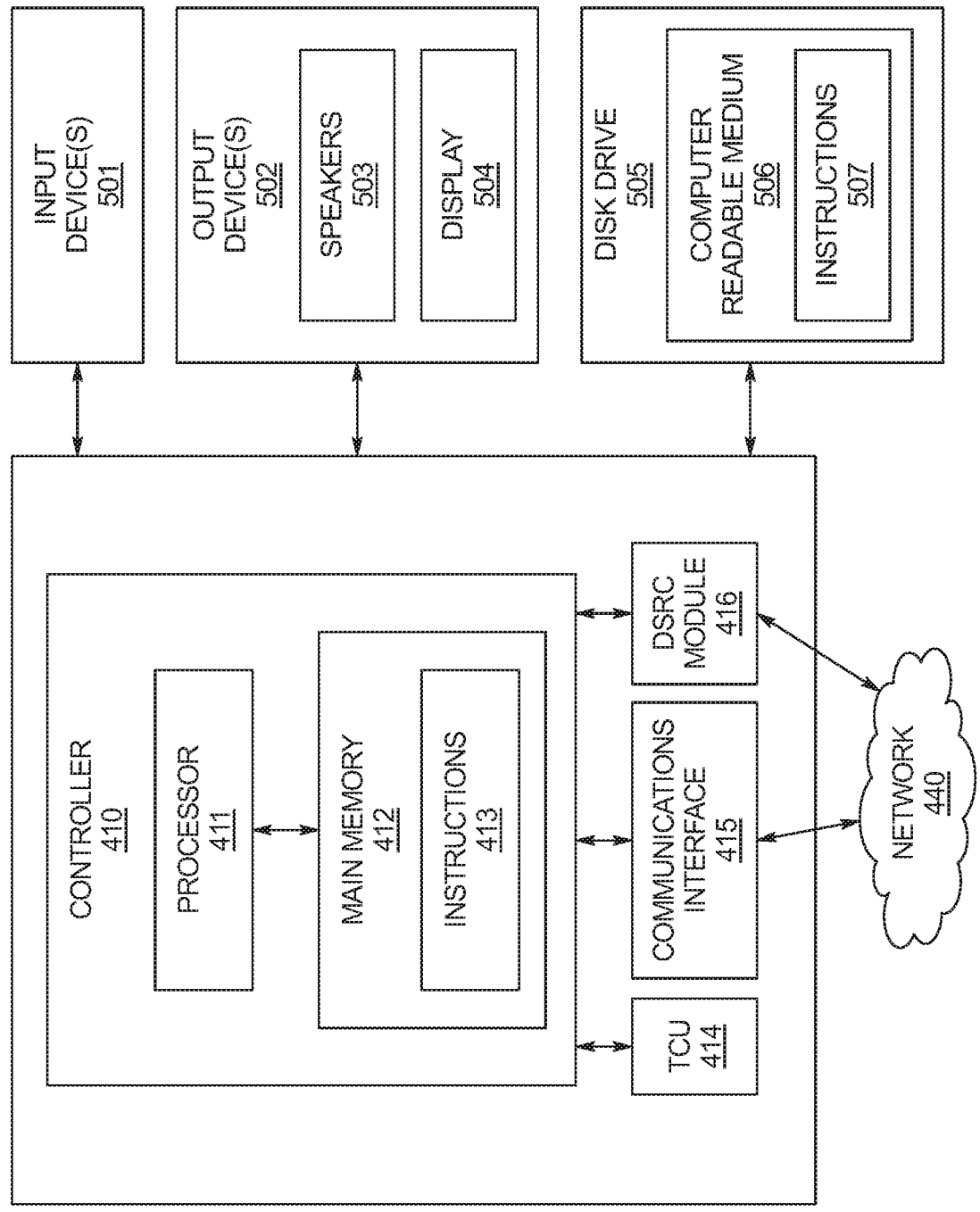

CELLULAR SERVICE BORROWING USING DEDICATED SHORT RANGE COMMUNICATION TECHNOLOGY

CROSS-REFERENCE TO RELATED APPLICATIONS

This is the National Stage of International Application No. PCT/US2015/043797, filed on Aug. 5, 2015 and titled "Cellular Service Borrowing Using Dedicated Short Range Communication Technology," which is incorporated by reference in its entirety.

TECHNICAL FIELD

The present disclosure generally relates to a system and method for cellular service borrowing in vehicles.

BACKGROUND

Vehicular communication systems are a network of vehicles and roadside units that provide information to each other using dedicated short range communications (DSRC) devices. Dedicated short range communication refers to one-way or two-way short-range to medium-range wireless communication channels specifically designed for automotive use. DSRC transceivers will be standard equipment in many vehicles in the near future, to allow the vehicles to take advantage of Intelligent Transportation System capabilities. DSRC systems are available for vehicle-to-vehicle (V2I) and vehicle-to-infrastructure (V2X) applications, both safety-related and otherwise. Despite the advances in the use of wireless communications technology in the areas noted above, opportunities still exist to develop the capabilities further. A significant benefit could be provided to drivers by extending the secure payment transaction capabilities of NFC to operate with the vehicle-to-infrastructure environment of DSRC, thus allowing payments to be made from the safety and security of a vehicle, even while the vehicle is moving.

When a driver is unable to place a phone call because a cellular phone is unavailable or because the driver's vehicle telematics control unit is not functioning properly, the driver would benefit from a system that provides an alternative approach to place an outside call.

SUMMARY

This application is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detailed description, and such implementations are intended to be within the scope of this application.

Exemplary embodiments provide systems and methods for cellular service borrowing between vehicles. More particularly, the system uses Dedicated Short Range Communication (DSRC) technology in Telematics. According to the present disclosure when the vehicle passenger of first vehicle wants to place a cellular service (i.e., such as a phone call) but does not possess a phone or infrastructure in the first vehicle to complete the cellular service, then the passenger sends a message to surrounding vehicles via DSRC technology. This message requests a cellular call "borrowing" from other vehicles. If one of the surrounding vehicles accepts the request, the surrounding vehicle completes the cellular service (i.e., places the phone call) and relays cellular service audio back to first passenger's vehicle via DSRC. The phone call can be placed via cell phone or telematics control unit present in the surrounding vehicle.

According to other embodiments, the cellular service is not limited to voice call service. It can be Internet connection service, SMS, and any other type of cellular service.

BRIEF DESCRIPTION OF THE DRAWINGS

For a better understanding of the invention, reference may be made to embodiments shown in the following drawings. The components in the drawings are not necessarily to scale and related elements may be omitted so as to emphasize and clearly illustrate the novel features described herein. In addition, system components can be variously arranged, as known in the art. In the figures, like referenced numerals may refer to like parts throughout the different figures unless otherwise specified.

FIG. 4 illustrates a block diagram including components of one embodiment of the cellular service borrowing vehicle control system of the present disclosure.

DETAILED DESCRIPTION OF EXAMPLE EMBODIMENTS

Figure 1:
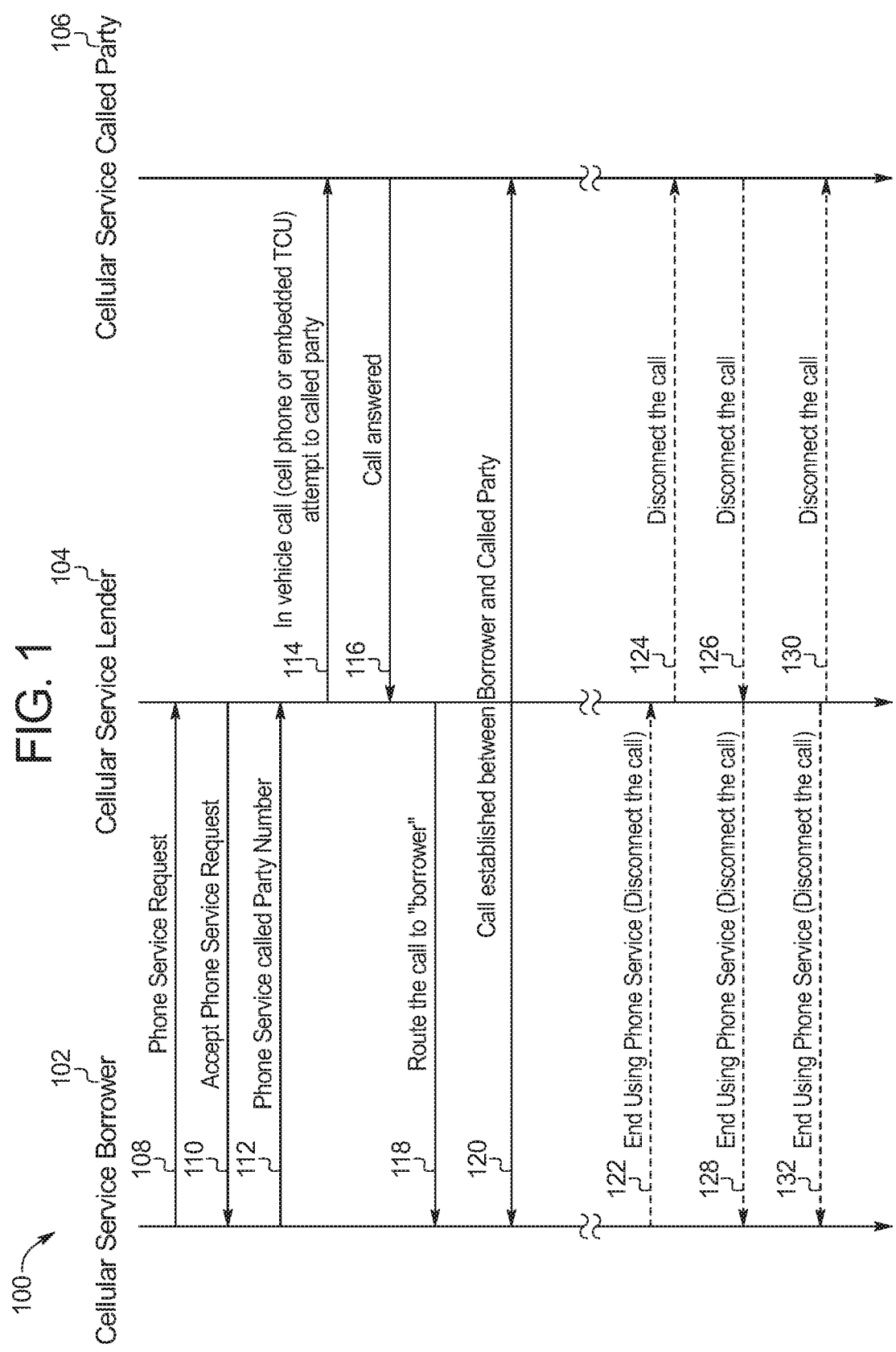
FIG. 1 is a diagram illustrating a process for operating one example embodiment of the cellular service borrowing system of the present disclosure.

While the system and method for cellular service borrowing of the present disclosure may be embodied in various forms, there are shown in the drawings, and will hereinafter be described, some exemplary and non-limiting embodiments of the vehicular system and method. The present disclosure is to be considered an exemplification of the system and method of cellular service borrowing and is not intended to limit the cellular service borrowing system and method to the specific embodiments illustrated and described herein. Not all of the depicted components described in this disclosure may be required, however, and some embodiments may include additional, different, or fewer components from those expressly described herein. Variations in the arrangement and type of the components may be made without departing from the spirit or scope of the claims set forth herein.

Various embodiments of the present disclosure provide a system and method for cellular service borrowing in vehicles. Generally, the cellular service borrowing system uses Dedicated Short Range Communication (DSRC) technology in Telematics to enable a passenger in a first vehicle to borrow cellular service from a second vehicle. According to embodiments, when the vehicle passenger of a first vehicle wants to make a phone call but doesn't possess the phone or infrastructure in the first vehicle to make a call, then the passenger sends a message to surrounding vehicles via Dedicated Short Range Communication technology. This message requests a cellular call "borrowing" from other vehicles. If one of the surrounding vehicles accepts the request, the surrounding vehicle places the phone call and relays the phone audio back to first passenger's vehicle via DSRC. The surrounding vehicle also receives first passenger's voice in the surrounding vehicle via DSRC technology in order to transmit it through the call. The phone call can be placed via cell phone or telematics control unit present in the surrounding vehicle. Further, the cellular service is not limited to voice call service. It can be Internet connection service, SMS etc.

The components of the cellular service borrowing system of the present disclosure (described in detail below) may be included on, within, or otherwise integrated with a vehicle. One or more of the components of the cellular service borrowing system may be shared with one or more components of existing vehicle systems.

The cellular service borrowing system may be included in or otherwise usable with any suitable vehicle, such as (but not limited to): (1) a non-commercial passenger vehicle such as a sedan or a truck; (2) a commercial vehicle such as a tractor-trailer; or (3) a non-civilian vehicle such as a vehicle used by a law enforcement agency, a government agency, an emergency response agency (e.g., a fire response agency), or a medical response agency (e.g., a hospital). This list is not exhaustive, and is provided for exemplary purposes only.

The features, processes, and methods described herein with respect to the capabilities of the cellular service borrowing system may be implemented by a telematics control tool running on the vehicle control system. The telematics control tool may be a program, application, and/or combination of software and hardware that is incorporated on one or more of the components that comprise the telematics control system. The cellular service borrowing system is described in more detail below.

Although the vehicle and the features corresponding to the cellular service borrowing system described herein are described below in situations in which the vehicle is moving, it is also within the scope of this disclosure that the same features may apply when the vehicle is in a stationary state (e.g., parked, stopped at a red light, or stopped in traffic).

FIG. 1 is a diagram depicting an example process or method 100 of the cellular service borrowing system of the present disclosure. In various embodiments, the process 100 is represented by a set of instructions stored in one or more memories and executed by one or more processors (such as those described below in connection with FIG. 4). Although the process 100 is described with reference to the diagram shown in FIG. 1, many other processes of performing the acts associated with this illustrated process 100 may be employed. For example, the order of certain of the illustrated interactions may be changed, certain of the interactions may be optional, and/or certain of the interactions may not be employed.

As depicted in FIG. 1, the cellular service borrowing system facilitates sequence of interactions between a cellular service borrower 102 of a first vehicle, a cellular service lender 104 of a second vehicle, and/or a cellular service receiver party 106. In some embodiments, the sequence may be associated with a method of cellular service borrowing. For example, the telematics unit 414 may implement the functionalities depicted and described herein by executing an application in the first vehicle.

In some embodiments, the vehicle controller 410 may implement relevant portions of the sequence such as by executing the application and interfacing with the network. In embodiments, the application may be the cellular service borrowing application or a portion thereof, such as requesting cellular service aspect of the application. In embodiments, the application may be a computer program stored on a non-transitory computer readable medium that is executable by a processor 411 of the vehicle controller 410. The cellular service borrower 102 and/or the cellular service lender 104 may interact with one another and/or the cellular service receiver party 106 through a user interface 415 (e.g., a touchscreen) of the respective vehicle. Although FIG. 1 is described with respect to placing a voice call to a cellular service receiving party 106, it should be appreciated that other types of cellular services (e.g., SMS, internet connection, chat, etc.) can be similarly involved in the sequence 100.

In operation of this embodiment, the cellular service borrowing system enables a cellular service borrower 102 of a first vehicle to place a voice call to a cellular service receiving party 106 via a cellular service lender 106 of a second vehicle. More particularly, the cellular service borrower 102 of the first vehicle is unable to place a call from the first vehicle due to a lack of a phone or the requisite infrastructure. According to this embodiment, the cellular service borrower 102 places a cellular service request to all surrounding vehicles, as indicated by 108. For example, a passenger in a first car inputs a request to place a call into an input device 501, such as a Human to Machine Interface (HMI) of the first vehicle. The cellular service borrowing system transmits the request to all surrounding vehicles within a predetermined range via DSRC technology.

DSRC technology refers to a two-way short-to-medium range wireless communications capability that permits data transmission in communications-based active safety applications. The Federal Communications Commission (FCC) allocated 75 MHz of spectrum in the 5.9 GHz band for use by Intelligent Transportations Systems (ITS) vehicle safety and mobility applications.

It should be appreciated that the DSRC technology only permits communication between two vehicles as long as the two vehicles remain within the predetermined range.

Continuing with the above described example, the request to borrow cellular service to place a call appears on the HMI of all vehicles within a predetermined range. The cellular service borrowing system enables a passenger of a second vehicle (within the predetermined range) to accept the request, as indicated by 110. The cellular service borrowing system notifies the cellular service borrower 102 that the cellular service lender 104 has accepted the request. The cellular service borrowing system prompts the cellular service borrower 102 to call the cellular service receiver 106, as indicated by 112. The cellular service borrowing system transmits the cellular service borrower's 102 specified number to place the desired call.

The cellular service borrowing system then enables the cellular service lender 104 to place the call, as indicated by 114. The cellular service lender 104 may place the call through a cellular phone or through the telematics control unit of the second vehicle. More specifically, in certain embodiments a cellular phone in the second vehicle is paired with the vehicle's infotainments system via Bluetooth technology. A passenger of the second vehicle can place the phone call using an input device such as a touch screen of the vehicle's infotainment system. The placed call is completed through the cell phone via Bluetooth link. Similarly, the infotainment system is connected to the telematics control unit which comprises of a cellular modem. A passenger of the second vehicle can similarly place the call through the telematics control unit by using the input device (such as a touch screen).

The cellular service borrowing system determines whether the call is answered. If the cellular service receiving party 108 does not answer the call, the cellular service borrowing system cancels the call attempt and notifies the borrower. If the cellular service receiver 106 answers the call, as indicated by 116, the call is routed to the cellular service borrower, as indicated by 118. The call is established between the cellular service borrower 102 and the cellular service receiver 106, as indicated by 120.

The call is connected to the first vehicle through a data link uploaded through DSRC technology to vehicle. The cellular service borrower 102 in the first vehicle can listen to the call through the speaker system in the vehicle and can communicate back to the cellular service receiving party 108 through the microphone system in the vehicle. Where the cellular service being transmitted is an SMS message or an internet connection, the passenger in the first vehicle may utilize the HMI interface to communicate with the cellular service receiver 108.

The next step in the cellular service borrowing process 100 is to determine when the call is ended. The dashed lines at the bottom of the diagram of FIG. 1 indicate three different scenarios for ending the call. A first scenario is when the cellular service borrower 102 ends the phone call (i.e., passenger in the first vehicle disconnects the call). In this scenario, the cellular service borrowing system disconnects the call with the cellular service lender 104, as indicated by 122, and the cellular service receiving party, as indicated by 124.

A second scenario is if the cellular service receiving party 106 ends the call. In the second scenario, the cellular service borrowing system disconnects the call between the cellular service receiving party 106 and the cellular service lender 104, as indicated by 126. Consequently, the cellular service borrowing system disconnects the communication between the cellular service lender and the cellular service borrower 102, as indicated by 128.

A third scenario is where the cellular service lender 104 ends the call. This can happen due to the second vehicle exiting a road and traveling outside of the DSRC range with the cellular service borrower. In this scenario, the cellular service borrowing system disconnects the interaction between the cellular service lender 104 and the cellular service receiving party 106, as indicated by 130. The cellular service borrowing system also disconnects the call between the cellular service lender 104 and the cellular service borrower 102, as indicated by 132.

It should be appreciated that the second vehicle must maintain a certain distance from the first vehicle. (i.e., 300-500 meters). If either vehicle travels outside of this range, the call can be dropped. Thus, in a preferable embodiment, both the first and second vehicles are traveling in the same direction. In an alternative embodiment, the cellular service lender 104 is a stationary vehicle, such as a vehicle parked in a parking lot.

In an alternative embodiment, the cellular service borrowing system is utilized to transmit an SMS text message through the DSRC system. The SMS text message would appear on the HMI interface.

The cellular service can also be an Internet connection. The borrower can run any applications that require internet connection like Facebook, twitter to update his post or chat with friends. In this case, the cellular service lender 104 may simply make the Internet connection through the cellular network. It should be appreciated that in this example embodiment, there is no cellular service called party 106.

Figure 2:
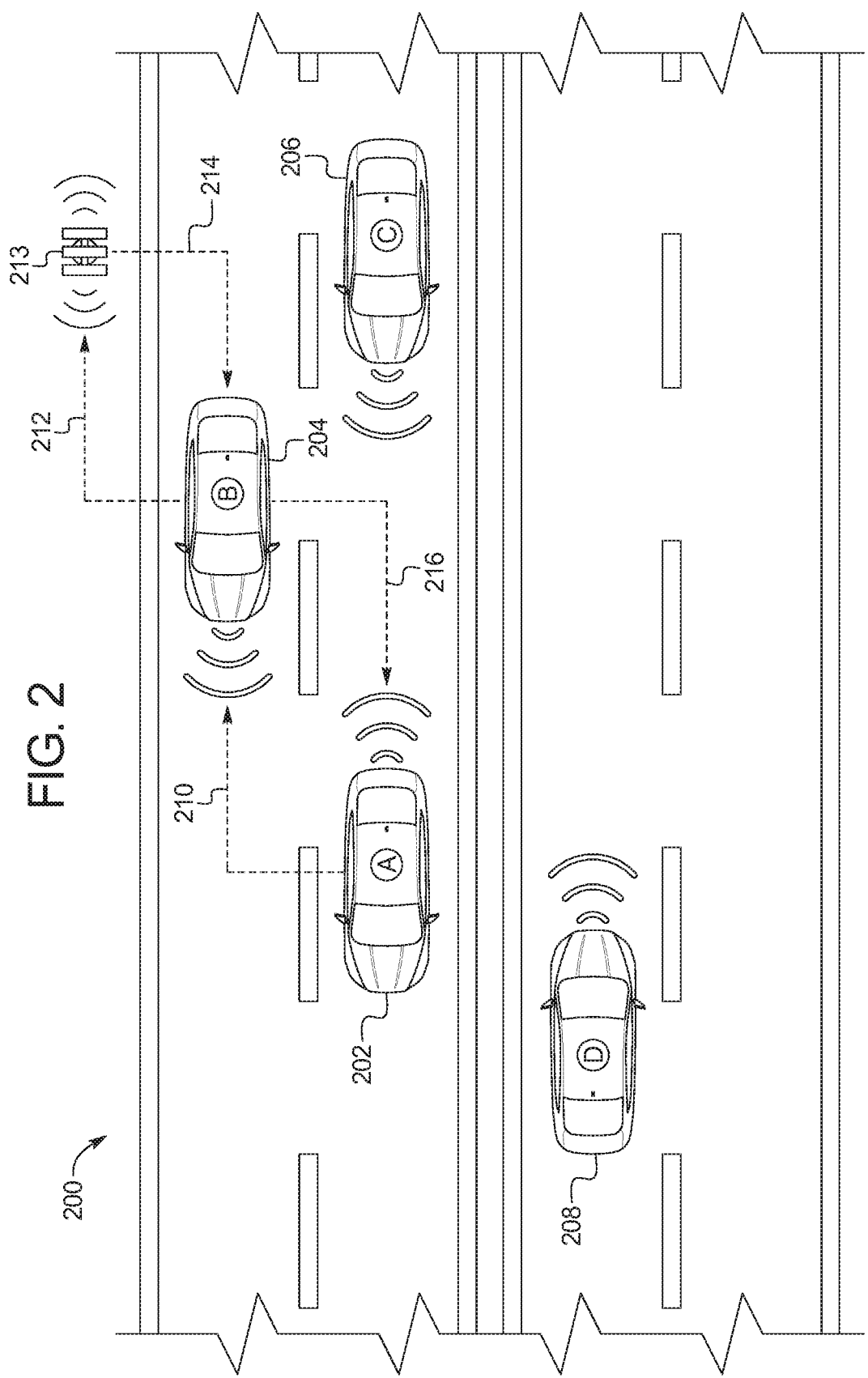
FIG. 2 is an illustration of an example cellular service borrowing system of the present disclosure.

FIG. 2 is an illustration of the above described embodiment of the present disclosure. As depicted in FIG. 2, there are four vehicles 202, 204, 206, 208 on the road 200. A passenger in vehicle A 202 wishes to make a phone call but is unable to. According to this embodiment, the passenger in vehicle A 202 is the cellular service borrower, and the cellular service borrower utilizes the DSRC module of vehicle A to transmit a message to all surrounding vehicles 204, 206, 208 requesting a cellular service. This request appears on the HMI interface of the surrounding vehicles 204, 206, 208. The passenger inside vehicle B 204 utilizes the DSRC module inside vehicle C to accept the request. The passenger inside vehicle B 204 is the cellular service lender.

Once the cellular service lender accepts the request, as depicted in FIG. 2, the cellular service borrower sends the telephone number to the cellular service lender, as depicted by line 210. The cellular service lender then uses a cellular phone, or the vehicle's TCU module 414 to place the phone call, as indicated by line 212. The TCU module 414 comprises a cellular modem that can place a call in the cellular network 213. Accordingly, the second vehicle utilizes a cellular network 213 to execute the call.

Once the call is answered, the call is connected between the cellular service receiving party and the cellular service lender in vehicle B 204, as indicated by line 214. The call is then routed to the cellular service borrower in vehicle A 202, as indicated by line 216. The cellular service borrower utilizes the speaker system and the microphone system of vehicle A 202 to communicate with the cellular service receiving party.

It should be appreciated that vehicle A 202 and vehicle B 204 are traveling in the same direction. It is preferable that the cellular service borrower and the cellular service lender are traveling in the same direction. If the two are traveling in opposite directions, the two vehicles may not remain within range for the DSRC communication and the call could be dropped. For example, in this embodiment, if vehicle D 208 had accepted the request, the call could have dropped once vehicle D 208 is out of range from vehicle A 202.

FIG. 4 illustrates a block diagram of certain vehicular components of one example embodiment of the cellular service borrowing system and method. As described above, the cellular service borrowing system and method includes at least two vehicles. It should be appreciated that in certain embodiments, the cellular service borrowing system and method may include different, fewer, or additional components than those described below and shown in FIG. 4 for one or more vehicles of the system and method.

In certain embodiments, each vehicle 400 includes a controller 410 comprised of at least one processor 411 in communication with a main memory 412 that stores a set of instructions 413. The processor 411 is configured to communicate with the main memory 412, access the set of instructions 413, and execute the set of instructions 413 to cause the cellular service borrowing system and method to perform any of the methods, processes, and features described herein. The cellular service borrowing system and method also includes a telematics control unit 414 (described below) in communication with the controller 410, a communications interface 415 in communication with the controller 410, and a DSRC module in communication with the controller.

The processor 411 may be any suitable processing device or set of processing devices such as, but not limited to: a microprocessor, a microcontroller-based platform, a suitable integrated circuit, or one or more application-specific integrated circuits (ASICs) configured to execute the set of instructions 413. The main memory 412 may be any suitable memory device such as, but not limited to: volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.); unalterable memory (e.g., EPROMs); and/or read-only memory.

The cellular service borrowing system and method includes a communications interface 415. The communications interface 415 is comprised of a wired and/or wireless network interface to enable communication with an external network 440. The external network 440 may be a collection of one or more networks, including standards-based networks (e.g., 2G, 3G, 4G, Universal Mobile Telecommunications System (UMTS), GSM (R) Association, Long Term Evolution (LTE)™, or more); WiMAX; Bluetooth; near field communication (NFC); WiFi (including 802.11 a/b/g/n/ac or others); WiGig; Global Positioning System (GPS) networks; and others available at the time of the filing of this application or that may be developed in the future. Further, the external network(s) may be a public network, such as the Internet; a private network, such as an intranet; or combinations thereof, and may utilize a variety of networking protocols now available or later developed including, but not limited to, TCP/IP-based networking protocols.

In one embodiment, the DSRC module 416 includes a DSRC radio for wirelessly communicating with the public or private infrastructure. In another embodiment, the wireless transceiver could be a Wi-Fi radio, or some other type of radio. The DSRC radio can communicate with any entity which has its own DSRC communications capability or is connected to the DSRC infrastructure, including both public services and private enterprises.

In some embodiments, the set of instructions 413 stored on the main memory 412 and that are executable to enable the functionality of the cellular service borrowing system and method may be downloaded from an off-site server via the external network 440.

Further, in some embodiments, the cellular service borrowing system and method may communicate with a central command server via the external network 440. For example, the cellular service borrowing system and method may communicate cellular service request information obtained by the telematics unit of the second vehicle of cellular service borrowing system and method to the central command server by controlling the communications interface 415 to transmit the cellular service request information to the central command server via the external network 440. The cellular service borrowing system and method may also communicate any generated data to the central command server.

It should be appreciated that in the example embodiments described above, the first vehicle (the vehicle requesting the service) does not include a network 440, or the network 440 is inoperative. More specifically, for the first vehicle the DSRC module 416 communicates directly to surrounding vehicles. In the example embodiments described above, the second vehicle (the vehicle executing the cellular service), has an operative network that the second vehicle utilizes to place the call.

The cellular service borrowing system and method is configured to communicate with a plurality of vehicle components and vehicle systems (such as via one or more communications buses (not shown)) including: one or more input devices 501, one or more output devices 502, and a disk drive 505.

The input devices 501 may include any suitable input devices that enable a driver or a passenger of the vehicle to input modifications or updates to information referenced by the cellular service borrowing system and method as described herein. The input devices 501 may include, for instance, a control knob, an instrument panel, a keyboard, a scanner, a digital camera for image capture and/or visual command recognition, a touch screen, an audio input device (e.g., cabin microphone), buttons, a mouse, or a touchpad.

The output devices may include instrument cluster outputs (e.g., dials, lighting devices), actuators, a display 504 (e.g., a liquid crystal display ("LCD"), an organic light emitting diode ("OLED"), a flat panel display, a solid state display, a cathode ray tube ("CRT"), or a heads-up display), and speakers 503. It should be appreciated that in the embodiment described above, after the cellular service lender routes the cellular service to the cellular service borrower, any audio output corresponding to the requested cellular service is output through the vehicle speakers.

The disk drive 505 is configured to receive a computer readable medium 506. In certain embodiments, the disk drive 505 receives the computer-readable medium 506 on which one or more sets of instructions 507, such as the software for operating the cellular service borrowing system and method, can be embedded. Further, the instructions 507 may embody one or more of the methods or logic as described herein. In a particular embodiment, the instructions 507 may reside completely, or at least partially, within any one or more of the main memory 412, the computer readable medium 506, and/or within the processor 411 during execution of the instructions by the processor 411.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing, encoding or carrying a set of instructions for execution by a processor or that cause a computer system to perform any one or more of the methods or operations disclosed herein.

Figure 3:
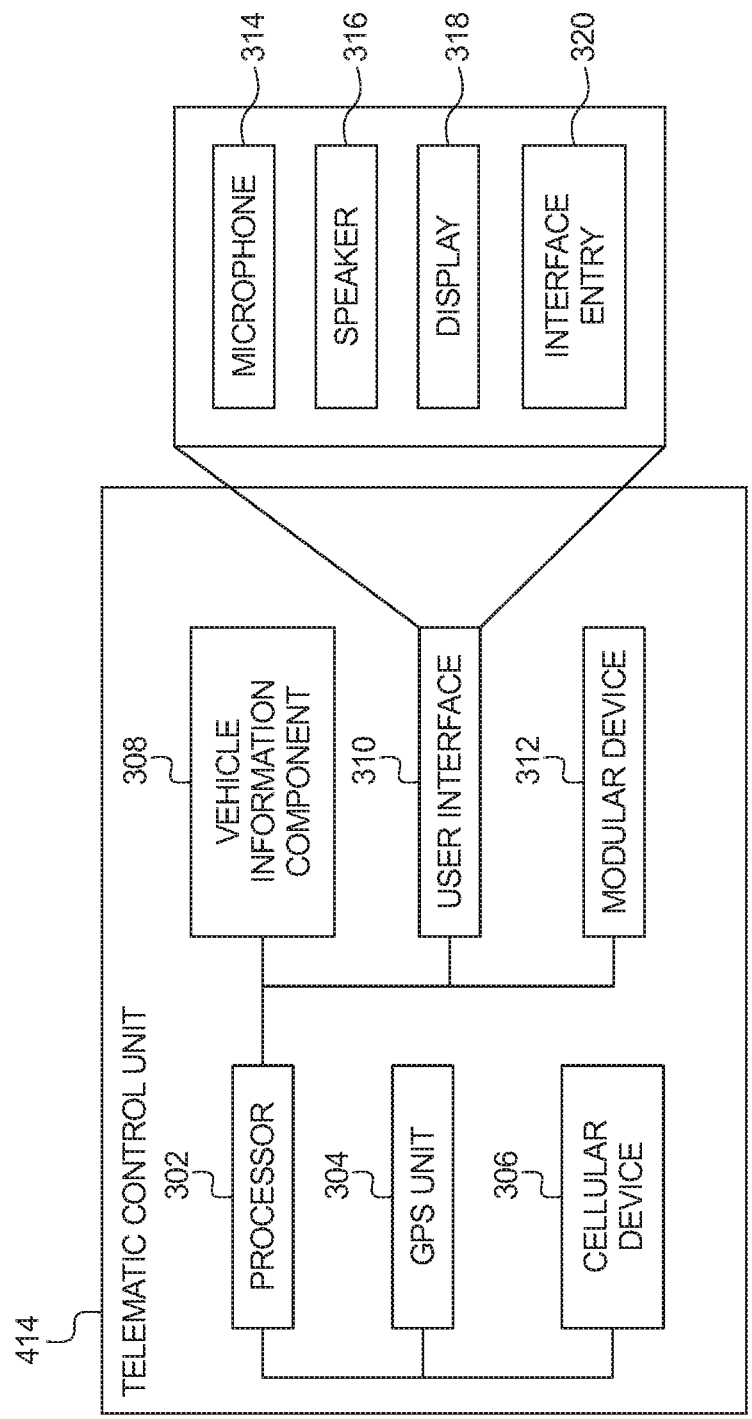
FIG. 3 illustrates a block diagram of the telematics control unit of the present disclosure.

FIG. 3 illustrates a telematics control unit (TCU) of one example embodiment of the cellular service borrowing system and method. Other embodiments of the cellular service borrowing system and method may include different, fewer, or additional components than those described below and shown in FIG. 4.

As depicted in FIG. 3, the TCU 414 includes a processor 302, a built-in global positioning system (GPS) unit 304, a cellular device 306, such as a cellular modem, for transmitting and receiving wireless information via wireless communications device, a vehicle information component 308, and a user interface 310. The user interface 310 includes one or more of a microphone 314, a speaker 316, a display 318, such as a touch sensitive screen, and interface entry 320 for allowing the user to perform various interactive functions.

Any process descriptions or blocks in the figures, should be understood as representing modules, segments, or portions of code which include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

What is claimed is:

1. A cellular service borrowing system comprising:
 a controller of a first vehicle configured to transmit a cellular service request to a second vehicle, the cellular service request excluding a user-selected number for placing a call to a cellular service receiving party; and
 responsive to acceptance of the cellular serve request at the second vehicle, transmit, to the second vehicle, a user-selected number for placing a call to a cellular service receiving party; and
 a controller of the second vehicle configured to:
  receive the cellular service request from the first vehicle;
  accept the cellular service request;
  responsive to accepting the cellular service request, receive the user-selected number;
  place the call using the user-selected number; and
  if the call is accepted by the cellular service receiving party, route the call to the first vehicle.

2. The system of claim 1, wherein the controller of the first vehicle transmits the cellular service request to the second vehicle via a short range communication system.

3. The system of claim 2, wherein the short range communication system is a dedicated short range communication system.

4. The system of claim 1, wherein the controller of the second vehicle communicates with a telematics control unit of the second vehicle to place the cellular service.

5. The system of claim 4, wherein the telematics control unit comprises a cellular modem that communicates with a cellular network to complete the cellular service request.

6. The system of claim 1, wherein the controller of the first vehicle outputs audio from the call through speakers in the first vehicle.

7. A cellular service borrowing system comprising:
 a controller of a vehicle configured to:
  receive a cellular service request from a surrounding vehicle, the cellular service request excluding a user-selected number for placing a call to a cellular service receiving party;
  accept the cellular service request;
  responsive to accepting the cellular service request, receives the user-selected number;
  place the call using the user-selected number; and
  if the call is accepted by the cellular service receiving party, route the call to the surrounding vehicle.

8. The system of claim 7, wherein the controller of the vehicle receives the cellular service request via a short range communication system.

9. The system of claim 8, wherein the short range communication system is a dedicated short range communication system.

10. The system of claim 1, wherein the vehicle includes a telematics control unit.

11. The system of claim 10, wherein the controller of the vehicle communicates with the telematics control unit of the vehicle to place the cellular service.

12. The system of claim 10, wherein the telematics control unit comprises a cellular modem that communicates with a cellular network to complete the cellular service request.

13. A cellular service borrowing method comprising:
 receiving at a controller of a first vehicle, a cellular service request from a surrounding vehicle, the cellular service request excluding a user-selected number for placing a call to a cellular service receiving party;
 accepting, at the controller of the first vehicle, the cellular service request;
 responsive to accepting the cellular service request, receiving the user-selected number;
 placing, using the controller of the first vehicle, the call using the using the user-selected number; and
 if the call is accepted by the cellular service receiving party, routing the call to the surrounding vehicle.

14. The method of claim 13, wherein routing the cellular service request to the surrounding vehicle includes using a short range communication system.

15. The method of claim 14, wherein the short range communication system is a dedicated short range communication system.

16. The method of claim 13, wherein the controller of the vehicle communicates with a telematics control unit of the vehicle to place the cellular service.

17. The system of claim 16, wherein the telematics control unit comprises a cellular modem that communicates with a cellular network to complete the cellular service request.

* * * * *